United States Patent [19]
Delphonse

[11] Patent Number: 5,997,306
[45] Date of Patent: Dec. 7, 1999

[54] METHOD FOR INSTRUCTING THE COGNITIVE RELATIONSHIPS BETWEEN PRIMARY AND RELATED ELEMENTS

[76] Inventor: Joseph B. Delphonse, 241 Palmdale Dr., Apt. 7, Williamsville, N.Y. 14221

[21] Appl. No.: 08/991,126

[22] Filed: Dec. 16, 1997

Related U.S. Application Data

[60] Provisional application No. 60/035,893, Jan. 24, 1997.

[51] Int. Cl.$^6$ .......................... G09B 19/00; G09B 19/02; G09B 13/00; G09B 15/00
[52] U.S. Cl. .......................... 434/236; 434/188; 434/227; 434/258; 84/470 R
[58] Field of Search ..................................... 434/188, 219, 434/222, 227–233, 236, 258; 84/470 R, 471 R, 477 R, 478, 479 R, 479 A, 480, 485 R

[56] References Cited

U.S. PATENT DOCUMENTS

| | | | |
|---|---|---|---|
| 3,501,849 | 3/1970 | Olsen et al. | 35/6 |
| 3,611,586 | 10/1971 | Kuramochi | 35/6 |
| 4,185,400 | 1/1980 | Gall et al. | 35/5 |
| 4,253,248 | 3/1981 | Cornish | 434/227 |
| 4,295,407 | 10/1981 | Leonard | 84/471 R |
| 4,412,473 | 11/1983 | Laflamme | 84/485 R |
| 4,465,477 | 8/1984 | AvGavaar | 434/233 |
| 4,480,521 | 11/1984 | Schmoyer | 84/1.28 |
| 4,650,349 | 3/1987 | Westreich | 400/98 |
| 4,690,644 | 9/1987 | Flanders et al. | 434/158 |
| 4,902,231 | 2/1990 | Freer | 434/227 |
| 4,909,739 | 3/1990 | Ladner et al. | 434/233 |
| 5,597,969 | 1/1997 | Brauer | 84/473 |

*Primary Examiner*—Robert A. Hafer
*Assistant Examiner*—John Edmund Rovnak
*Attorney, Agent, or Firm*—Hodgson, Russ, Andrews, Woods & Goodyear LLP

[57] ABSTRACT

The present invention is directed to an instructional method based on the concept that as a student learns to perform a mental task consisting of a set of elements or steps, whether conceptual or concrete, the student develops a distinct mental connection or path for every element related to the primary mental task being learned. For example, as a student learns to type a particular key on a keyboard, (the primary mental task), the student develops a distinct mental impression for every typing key logically associated with the first key. In other words, a distinct connection or path is defined as a link between two or more elements, one key being a primary element, the other being a related key connected to the primary key by a logical mental step. The present method is also useful for learning a musical instrument, a foreign language, mathematics, test taking skills, and the like logical though processes. The present method can be presented to the student via a written format such as on a chalk board, in a printed text format, or in a computer program.

14 Claims, No Drawings

METHOD FOR INSTRUCTING THE COGNITIVE RELATIONSHIPS BETWEEN PRIMARY AND RELATED ELEMENTS

CROSS-REFERENCE TO RELATED APPLICATION

This application claims priority based on earlier filed provisional application Serial No. 60/035,893, filed Jan. 24, 1997, which is incorporated herein by reference.

BACKGROUND OF INVENTION

1. Field of the Invention

The present invention generally relates to a system or method of teaching a student how to learn mental and/or physical steps or tasks. More particularly, the present invention relates to an instructional method of teaching the cognitive relationships between elements in a set by practicing various patterns of logical arrangements of a primary element and its connections to related elements. The present instructional method is useful for developing teaching lessons so that a student is able to efficiently learn and retain material such as, for example, typing lessons, a musical instrument, a foreign language, mathematics, test taking skills, and like logical thought processes.

2. Prior Art

Prior to the present invention, cognitively retaining mental and/or physical steps or tasks meant practicing a series of known sequences of the subject matter that was intended to be learned. For teaching typing, various devices and methods for that purpose are shown in U.S. Pat. Nos. 3,501,849 to Olsen, 3,611,586 to Kuramochi, 4,185,400 to Gall, John C. et al., 4,253,248 to Cornish, 4,465,477 to AvGavaar, 4,650,349 to Westreich, 4,690,644 to Flanders et al., 4,902, 231 to Freer and 4,909,739 to Ladner et al.

Generally, the prior art methods and devices teach typing by practicing relatively short, known or memorizable word sequences. A memorizable sequence is defined as a word that is easily or readily recalled by its spelling and letter composition. For example, a student learning the "s" key according to the prior art practices typing known words such as "self", "silk", and "soap". The problem is that the student learns the "s" key's position within the presented words, and not its location on the keyboard. The "s" key is typed by the left ring finger, but the commonly practiced known or memorizable words for teaching that key are not presented in relation to keyboard keys that are also typically typed by the left ring finger. If the student repeatedly practices typing "self" to learn the "s" key, she is only able to proficiently recall that word as a memorizable sequence and not necessarily retain the location of the "s" key on the keyboard. The conventional exercise of typing "self" for a prolonged period only causes those fingers that are required during the practice session to become conditioned in terms of the exact finger combination of the word. In other words, the student's ability to type the word "self" is a result of knowing the sequence of letters that makeup that word, and the exact fingers moved to strike each of those keys. Thus, the student would memorize the "s" key in terms of the word "self" as a previously known or readily memorizable sequence without necessarily learning the location of the "s" key on the keyboard.

Furthermore, learning the "s" key as part of a known word or readily memorizable sequence does not help the student to determine the position of the "x", "2", "w", and symbol "@" keys. Those keys are not related to the "s" key in the word "self", but are typically struck with the same left ring finger. It is true that the student can practice typing words according to the prior art that contain the "x", "s", "2", "w", and "@" keys and, that over time, if the student practices enough, she will become proficient at typing each one of those keys within sets of words or memorizable sequences. But, the student would have to practice many words that contain the "x" key, the "s" key, the "w" key, and the symbol "@" key, without any assurance that she would consequently be able to type them proficiently.

The problem is that the student tries to memorize the exact position of the various keys contained in the practiced words without actually memorizing the finger movement connection or exact position of the "s" key with respect to the other keys typically typed with the left ring finger. In that event, the student is not able to proficiently recall the exact locations of those keys by forming a mental image of their relative positions with respect to each other, and by mentally visualizing how far to extend and not to extend the left ring finger on the keyboard to type each of them. The same can be said for keys typically typed by the other fingers as well. Word or readily memorizable sequence typing lessons may be good for a student who is already competent on the keyboard, but not for a beginning student. For the beginning student, the prior art methods of teaching typing are difficult and reaching a proficient level of competency is problematic.

SUMMARY OF THE INVENTION

The present invention differs from the prior art by providing a systematic method for learning the cognitive relationships between elements in a set by practicing various logical arrangements or permutations of the elements. This is useful for teaching typing as well as other learned mental steps such as, for example, learning a musical instrument, a foreign language, mathematics, test taking skills, and like logical thought processes.

In particular, the present method provides a teacher with various patterns of logical arrangements or permutations of a primary element and its related elements to teach students that are not familiar with the subject being taught to learn and retain the subject matter. In that respect, the present invention is predicated on permutating n number of objects in a set. For example, when n=3 and the objects are a, b, and c, the permutations are abc, acb, bca, bac, cba, and cab. Here there are 6 permutations, or 3·2·1=3! of them. The product "3!" is read as "three factorial" and represents the product of all the positive integers between 1 and 3. In the general case of n elements, there are n!=n·(n−1) . . . 1 permutations. For example, if there are n typing keys on a keyboard, and repeat keys are not possible, then there are n! possible key combinations to be practiced.

In teaching typing, for example, the present method for instructing the cognitive relationships between primary and related elements introduces a series of systematically arranged set of keys that are typed by a particular finger or fingers. Once the keys typed by each of the fingers are mastered, the present invention introduces lessons for typing keys with each hand, and then finally with alternate hands. The present instructional system is based on the premise that as a student practices various logical arrangements of a set of elements, that person develops a distinct mental path or thought connection between the elements being learned.

Accordingly, as a student learns to type a home row or primary key in the context of other keys that are typically typed with the same finger on a typewriter or keyboard, that person develops a direct connection for every key being practiced by that finger. A distinct connection or path in the case of typing is defined as a same finger link between keys typically typed by that finger. There are respective direct connections for keys typed by each of the typing fingers. Secondary connections exist between keys typed by the same hand or an alternate hand. There is a direct connection between the "s" key and the "x" key because a typist uses the left ring finger to go from the "s" key to type the "x" key. There is a secondary connection or a same hand link between the "s" key and the "t" key, and there is an alternate hand link between any two keys on the keyboard. According to the present invention, the student becomes proficient at the various direct connections for each of the left and right pinky fingers, ring fingers, middle fingers and index fingers before advancing to hand link exercises and ultimately, alternate hand exercises.

In that manner, the present method teaches a person how to control their fingers while typing, and in that manner, to efficiently memorize and retain the various key positions. The logical arrangements may or may not result in a known or memorizable word sequence.

DETAILED DESCRIPTION OF THE INVENTION

The present invention is directed to teaching the cognitive relationships between a set of elements by practicing various patterns of logical arrangements of a primary element and its connected or related elements. If a set of elements (E1, E2, E3, . . . En) is defined as a primary element E1 and its related elements E2, E3, E4, . . . En, according to the present invention, the elements are systematically arranged and presented in various sequential patterns to teach and learn the interdependent relationships of each element with respect to the other elements in the set. The elements can be related to each other by their positional, spatial, audible, verbal, written, spoken, sung, played, motor movements, cognitive or other logical interrelationships. For example, if an original sequence is designated E1, E2, E3, E4, E5, E6 and E7, a first rearrangement or permutation of the original sequence might be E1, E7, E2, E6, E3, E5 and E4. A second rearrangement or permutation might be E2, E7, E3, E6, E4, E5, and E1. A third rearrangement or permutation might be E3, E7, E4, E6, E5, E1 and E2. A fourth rearrangement or permutation might be E4, E7, E5, E6, E1, E3 and E2. A fifth rearrangement or permutation might be E5, E7, E6, E1, E4, E2 and E3. A sixth arrangement or permutation might be E6, E7, E1, E5, E2, E4 and E3. And, a seventh rearrangement or permutation might be E7, E1, E6, E2, E5, E3 and E4. Other patterns of rearrangements or permutations of the elements will be readily apparent to those skilled in the art.

To further illustrate this concept, a first embodiment of the present invention will be described in detail with respect to a typewriter or computer keyboard. However, those skilled in the art will readily recognize that the present method is not limited to typing, but to any cognitive thought process that is learned by practicing patterns of logical arrangements of elements in a set of elements. For example, in teaching typing according to the present invention, the set of key elements are not necessarily arranged in known or readily memorizable word sequences that might be easily recalled by their spelling and letter composition. Instead, the present method involves practicing primary and secondary connections between a set of keys comprising a home row key and its associated keys, i.e., those keys that are typically typed with the same finger that types the primary home row key in the case of a primary connection and keys that are typed by the same hand and alternate hands in the case of a secondary connection, and permutating that set of keys into various patterns of logical arrangements to generate non-memorizable letter, number and symbol sequences for training purposes.

In that respect, teaching typing according to the present invention initially involves designating a finger to be learned, for example the left ring finger, and deriving a set of keys to be permutated consisting of letters, numbers and symbols that are typically typed with that finger. The original set is arranged into an arbitrary original sequence of keys and for illustrative purposes consists of the "x, s, w, 2, @" keys.

```
x  s  w  2  @
┌─────────────┐
│1  2  3  4  5│ (original
└─────────────┘  sequence)
```

In the original sequence, the "s" key is designated the home or primary key because in the rest position the left ring finger is positioned over or in contact with that key. The remaining "x, w, 2, @" keys are designated related keys in that they are related to the "s" key by typically being struck with the left ring finger originally at rest on the "s" key. In the arbitrary arrangement of the original sequence, the one (1) "x" key has the first position in the sequence, the two (2) "s" key has the second position in the sequence, the three (3) "w" key has the third position, the four (4) "2" key has the fourth position and the five (5) "@" key has the fifth position. Thus, the "x, s, w, 2 and @" keys are designated positions 1, 2, 3, 4 and 5, respectively, in the original sequence. The numbers below each key designating that key's position in the original sequence are arbitrary, but once established, are maintained throughout the various permutations that will be described in detail presently. Thus, as the original set of keys is permutated into various subsequent sequences of logical arrangements, the keys retain their original designations one to five (1 to 5) while their position in the subsequent sequences changes between first to fifth according to their permutated order.

According to the present invention, the original sequence of keys is rearranged or permutated into a first permutation or a first sequence (I) wherein the one "x" key retains the first position, the five "@" key is in the second position, the two "s" key is in the third position, the four "2" key is in the fourth position and the three "w" key is in the fifth position. Sequence (I) is derived by designating the first key of the original sequence as the first key of the first permutation (since this is the first sequence), followed by the last or fifth key, followed by the first key plus one, in this case the second key, followed by the last key minus one or the fourth key in this case, followed by the first key plus two or the third key.

(I)
```
x  @  s  2  w
┌─────────────┐
│1  5  2  4  3│
└─────────────┘
```

Thus, sequence (I) consists of the original sequence rearranged into positions 1, 5, 2, 4 and 3 corresponding to keys "x, @, s, 2 and w", respectively.

The second sequence (II) is derived by rearranging or permutating the original sequence wherein the two "s" key is now in the first position, the five "@" key is in the second position, the three "w" key retains the third position, the four "2" key is in the fourth position, and the one "x" key is in the fifth position. Sequence (II) is derived by designating the second key of the original sequence as the first key of the second permutation (since this is the second sequence), followed by the last or fifth key of the original sequence, followed by the second key plus one, in this case the third key, followed by the last key minus one or in this case the fourth key, and since there are no remaining keys between the second and fifth keys, followed by the first key at the beginning of the original sequence or in this case the first key.

(II)

| s | @ | w | 2 | x |
|---|---|---|---|---|
| 2 | 5 | 3 | 4 | 1 |

Thus, sequence (II) consists of the original sequence rearranged into positions 2, 5, 3, 4 and 1 corresponding to keys "s, @, w, 2 and x", respectively.

The third sequence (III) is derived by rearranging or permutating the original sequence wherein the three "w" key is now in the first position, the five "@" key is in the second position, the four "2" key is in the third position, the one "x" key is in the fourth position and the two "s" key is in the fifth position. Sequence (III) is derived by designating the third key of the original sequence as the first key of the third permutation (since this is the third sequence), followed by the last or fifth key of the original sequence, followed by the third key plus one or the fourth key, and since there are no remaining keys between the third and fifth keys, back to the beginning or first key of the original sequence, followed by the last remaining key before the first key of the sequence being permutated or in this case the second key.

(III)

| w | @ | 2 | x | s |
|---|---|---|---|---|
| 3 | 5 | 4 | 1 | 2 |

Thus, sequence (III) consists of the original sequence rearranged into positions 3, 5, 4, 1 and 2, corresponding to keys "w, @, 2, x and s", respectively.

Sequence (IV) is derived by rearranging or permutating the original sequence wherein the four "2" key is now in the first position, the five "@" key is in the second position, the one "x" key is in the third position, the three "w" key is in the fourth position and the two "s" key is in the fifth position. Sequence (IV) is derived by designating the fourth key of the original sequence as the first key of the fourth permutation (since this is the fourth sequence), followed by the last or fifth key of the original sequence, and since there are no remaining keys between the fourth and fifth keys, back to the beginning or first key of the original sequence, followed by the last remaining key in the sequence before the first key of the sequence being permutated or in this case the third key, followed by the first key plus one or the second key.

(IV)

| 2 | @ | x | w | s |
|---|---|---|---|---|
| 4 | 5 | 1 | 3 | 2 |

Thus, sequence (IV) consists of the original sequence rearranged into positions 4, 5, 1, 3 and 2, corresponding to keys "2, @, x, w and s", respectively.

Sequence (V) is derived by rearranging or permutating the original sequence wherein the five "@" key is now in the first position, the one "x" key is in the second position, the four "2" key is in the third position, the two "s" key is in the fourth position and the three "w" key is in the fifth position. Sequence (V) is derived by designating the fifth key of the original sequence as the first key of the fifth permutation (since this is the fifth sequence), and since there are no remaining keys after the fifth key back to the first key, followed by the last remaining key in the sequence or the fourth key, followed by the first key plus one or the second key, followed by the fourth key minus one or the third key.

(V)

| @ | x | 2 | s | w |
|---|---|---|---|---|
| 5 | 1 | 4 | 2 | 3 |

Thus, sequence (V) consists of the original sequence rearranged into positions 5, 1, 4, 2 and 3, corresponding to keys "@, x, 2, s and w", respectively.

While an original sequence of keys and permutations thereof has been illustrated for the left ring finger, those skilled in the art will readily recognize that original sequences and permutations thereof are derived for each of the typing fingers to enable the student to become proficient at learning the cognitive relationships between the respective fingers and the keys typically typed by them. Also, the original sequence need not be only five characters long, but can contain any number of keys typically typed by a particular finger, and a key can occur more than once in a set and/or a permutation thereof.

After the student has demonstrated an acceptable proficiency at the primary connections between the keys typed by each of the fingers, the student is now ready to advance to practicing secondary connections between keys typed by the same hand and ultimately to alternate hand exercises. According to the present invention, practicing non-associated keys that are not directly linked or connected with a primary key (for example, because they are not typically typed by the same finger) involves rearranging or permutating a set of keys different than those practices for the primary connections. As before, the keys are systematically rearranged into logical pattern sequences to enable the student to learn to proficiently switch his or her fingers and hands when typing regular words or phrases.

Thus, a second series of typing lessons involves practicing secondary connections between keys typed by the same hand or alternate hands. In the presently illustrated example, the set of keys are typically typed by alternate hands, and that set of keys is permutated into various patterns of logical arrangements to generate non-memorizable letter, number and symbol sequences. The exemplary second series of typing lessons consists of the "x, g, %, i, :, 9, e" keys.

| x | g | % | i | : | 9 | e | |
|---|---|---|---|---|---|---|---|
| 1 | 2 | 3 | 4 | 5 | 6 | 7 | (original sequence) |

In the original sequence, the "x" key is arbitrarily designated the home or primary key. The remaining "g, %, i, :, 9, e" keys are designated related keys. In the arbitrary arrangement of the original sequence, the one (1) "x" key has the first position in the sequence, the two (2) "g" key has the second position in the sequence, the three (3) "%" key has the third position, the four (4) "i" key has the fourth position, the five (5) ":" key has the fifth position, the six (6) "9" key has the sixth position and the seven (7) "e" key has the seventh position. Thus, the "x, g, %, i, :, 9 and e" keys are designated positions 1, 2, 3, 4, 5, 6 and 7, respectively, in the original sequence.

According to the present invention, the original sequence of keys is rearranged or permutated into a first permutation or a first sequence (I) wherein the one "x" key retains the first position, the seven "e" key is in the second position, the two "g" key is in the third position, the six "9" key is in the fourth position, the three "%" key is in the fifth position, the five ":" key is in the sixth position and the four "i" key is in the seventh position.

| x | e | g | 9 | % | : | i | (I) |
|---|---|---|---|---|---|---|---|
| 1 | 7 | 2 | 6 | 3 | 5 | 4 | |

Thus, sequence (I) consists of the original sequence rearranged into positions 1, 7, 2, 6, 3, 5 and 4 corresponding to keys "x, e, g, 9, %, : and i", respectively.

The second sequence (II) is derived by rearranging or permutating the original sequence wherein the two "g" key is now in the first position, the seven "e" key is in the second position, the three "%" key retains the third position, the six "9" key is in the fourth position, the four "i" key is in the fifth position, the five ":" key is in the sixth position and the one "x" key is in the seventh position.

| g | e | % | 9 | i | : | x | (II) |
|---|---|---|---|---|---|---|---|
| 2 | 7 | 3 | 6 | 4 | 5 | 1 | |

Thus, sequence (II) consists of the original sequence rearranged into positions 2, 7, 3, 6, 4, 5 and 1 corresponding to keys "g, e, %, 9, i, : and x", respectively.

The third sequence (III) is derived by rearranging or permutating the original sequence wherein the three "%" key is now in the first position, the seven "e" key is in the second position, the four "i" key is in the third position, the six "9" key is in the fourth position, the five ":" key is in the fifth position, the one "x" key is in the sixth position and the two "g" key is in the seventh position.

| % | e | i | 9 | : | x | g | (III) |
|---|---|---|---|---|---|---|---|
| 3 | 7 | 4 | 6 | 5 | 1 | 2 | |

Thus, sequence (III) consists of the original sequence rearranged into positions 3, 7, 4, 6, 5, 1 and 2, corresponding to keys "%, e, i, 9, :, x and g", respectively.

Sequence (IV) is derived by rearranging or permutating the original sequence wherein the four "i" key is now in the first position, the seven "e" key is in the second position, the five ":" key is in the third position, the six "9" key is in the fourth position, the one "x" key is in the fifth position, the three "%" key is in the sixth position and the two "g" key is in the seventh position.

| i | e | : | 9 | x | % | g | (IV) |
|---|---|---|---|---|---|---|---|
| 4 | 7 | 5 | 6 | 1 | 3 | 2 | |

Thus, sequence (IV) consists of the original sequence rearranged into positions 4, 7, 5, 6, 1, 3 and 2, corresponding to keys "i, e, :, 9, x, % and g", respectively.

Sequence (V) is derived by rearranging or permutating the original sequence wherein the five ":" key is now in the first position, the seven "e" key is in the second position, the six "9" key is in the third position, the one "x" key is in the fourth position, the four "i" key is in the fifth position, the two "g" key is in the sixth position and the three "%" key is in the seventh position.

| : | e | 9 | x | i | g | % | (V) |
|---|---|---|---|---|---|---|---|
| 5 | 7 | 6 | 1 | 4 | 2 | 3 | |

Thus, sequence (V) consists of the original sequence rearranged into positions 5, 7, 6, 1, 4, 2 and 3, corresponding to keys ":, e, 9, x, i, g and %", respectively.

The sixth sequence (VI) is derived by rearranging or permutating the original sequence wherein the six "9" key is now in the first position, the seven "e" key is in the second position, the one "x" key is in the third position, the five ":" key is in the fourth position, the two "g" key is in the fifth position, the four "i" key is in the sixth position and the three "%" key is in the seventh position.

| 9 | e | x | : | g | i | % | (VI) |
|---|---|---|---|---|---|---|---|
| 6 | 7 | 1 | 5 | 2 | 4 | 3 | |

Thus, sequence (VI) consists of the original sequence rearranged into positions 6, 7, 1, 5, 2, 4 and 3, corresponding to keys "9, e, x, :, g, i and %", respectively.

Sequence (VII) is derived by rearranging or permutating the original sequence wherein the seven "e" key is now in the first position, the one "x" key is in the second position, the six "9" key is in the third position, the two "g" key is in the fourth position, the five ":" key is in the fifth position, the three "%" key is in the sixth position and the four "i" key is in the seventh position.

| e | x | 9 | g | : | % | i | (VII) |
|---|---|---|---|---|---|---|---|
| 7 | 1 | 6 | 2 | 5 | 3 | 4 | |

Thus, sequence (VII) consists of the original sequence rearranged into positions 7, 1, 6, 2, 5, 3 and 4, corresponding to keys "e, x, 9, g, :, % and i", respectively.

According to an alternate embodiment of the present invention, lessons on playing a musical instrument, such as a piano, are taught so that the student learns at a higher proficiency level and within a shorter period of time than by the prior art. For any musical instrument, if playing chords with a root of "C" is considered a musical lesson, the cord "C" is arbitrarily defined as a primary element with the related elements being the chords Cm, Cdim, Caug(*1), Csus4, C7, Cm7, Cmaj7, Cm7-5, C7-5(*1), C7sus4, Cadd9, Cmadd9, CmM7 and Cdim7(*1). An original sequence of chords might be the following:

| C | C7-5(*1) | Cdim | Cadd9 | Cm | |
|---|---|---|---|---|---|
| 1 | 2 | 3 | 4 | 5 | (original sequence) |

Then, the original sequence of chords is rearranged or permutated in a first permutation or a first sequence (I) as follows:

| C | Cm | C7-5(*1) | Cadd9 | Cdim | (I) |
|---|----|----------|-------|------|-----|
| 1 | 5  | 2        | 4     | 3    |     |

A second sequence is as follows:

| C7-5(*1) | Cm | Cdim | Cadd9 | C | (II) |
|----------|----|------|-------|---|------|
| 2        | 5  | 3    | 4     | 1 |      |

A third sequence is as follows:

| Cdim | Cm | Cadd9 | C | C7-5(*1) | (III) |
|------|----|-------|---|----------|-------|
| 3    | 5  | 4     | 1 | 2        |       |

A fourth sequence is as follows:

| Cadd9 | Cm | C | Cdim | C7-5(*1) | (IV) |
|-------|----|---|------|----------|------|
| 4     | 5  | 1 | 3    | 2        |      |

A fifth sequence is as follows:

| Cm | C | Cadd9 | C7-5(*1) | Cdim | (V) |
|----|---|-------|----------|------|-----|
| 5  | 1 | 4     | 2        | 3    |     |

While a system of rearranging or permutating a set of elements has been disclosed, those skilled in the art will readily recognize that the disclosed permutation system is exemplary, and not inclusive. According to the present invention, any system or key for permutating the elements in a set into various rearrangements can be used to teach and learn the connections between the elements. Thus, the permutations can be according to a pattern or random. The only requirement is that the elements in the set are at least partially reordered or rearranged from one sequence to the next.

A computer program and manual for teaching and learning the cognitive relationship between elements in a set according to the present invention is commercially available from JoeBis Publishing, Inc., Williamsville, N.Y. under the title "Conceptual Effects".

It is appreciated that various modifications to the inventive concepts described herein may be apparent to those of ordinary skill in the art without departing from the spirit and scope of the present invention as defined by the appended claims.

What is claimed is:

1. A method for instructing a student regarding the cognitive relationships between any of the elements in a set, comprising the steps of:
    a) selecting a primary element from the set of elements to be taught;
    b) establishing a logical connection between the primary element and at least any two of the other elements in the set;
    c) arranging the primary element and the at least two other elements into an original sequence practiced by the student;
    d) permutating the original sequence of elements into subsequent sequences of the elements practiced by the student thereby enabling the student to develop a cognitive relationship between the primary element and the at least two other elements in the set; and
    e) selecting the elements of the set as any of the keys on a keyboard selected from the group consisting of an alphabet, symbols, characters and numerals.

2. The method of claim 1 including selecting the set of elements as keys typically typed by one particular finger as the logical connection between the primary element and the other elements.

3. The method of claim 1 including selecting the set of elements as keys typically typed by one hand as the logical connection between the primary element and the other elements.

4. The method of claim 1 including selecting the set of elements from all of the keys on a typewriter or computer keyboard.

5. A method for instructing a student regarding the cognitive relationships between a primary element (E) and its related elements (E1, E2, E3 . . . En-2, En-1, En) in a set, comprising the steps of:
    a) arranging the elements in an original sequence of the elements consisting of E, E1, E2, E3 . . . En-2, En-1, En;
    b) deriving a first permutation of the original sequence consisting of the first element E, followed by the last element En, followed by the first element plus one E1, followed by the last element minus one En-1, followed by the first element plus two E2, followed by the last element minus two En-2, followed by the first element plus three E3;
    c) deriving a second permutation of the original sequence consisting of the second element E1, followed by the last element En, followed by the second element plus one E2, followed by the last element minus one En-1, followed by the second element plus two E3, followed by the last element minus two En-2, and since there are no remaining elements between E3 and En-2, back to the first element E;
    d) deriving a third permutation of the original sequence consisting of the third element E2, followed by the last element En, followed by the third element plus one E3, followed by the last element minus one En-1, followed by the third element plus two En-2, and since there are no remaining elements between E3 and En-2, back to the first element E, followed by the third element minus one E1;
    e) deriving a fourth permutation of the original sequence consisting of the fourth element E3, followed by the last element En, followed by the fourth element plus one En-2, followed by the last element minus one En-1, followed by the first element E, followed by the fourth element minus one E2, followed by the first element plus one E1;
    f) deriving a fifth permutation of the original sequence consisting of the fifth element En-2, followed by the last element En, followed by the fifth element plus one En-1, followed by the first element E, followed by the fifth element minus one E3, followed by the first element plus one E1, followed by the fifth element minus two E2;

g) deriving a sixth permutation of the original sequence consisting of the sixth element En-1, followed by the last element En, followed by the first element E, followed by the sixth element minus one En-2, followed by the first element plus one E1, followed by the sixth element minus two E3, followed by the first element plus two E2;

h) deriving a seventh permutation of the original sequence consisting of the seventh element En, followed by the first element E, followed by the seventh element minus one En-1, followed by the first element plus one E1, followed by the seventh element minus two En-2, followed by the first element plus two E2, followed by the seventh element minus three E3; and i) selecting the elements as keys on a keyboard.

6. A method for instructing a student regarding the cognitive relationships between any of the elements in a set, comprising the steps of:

a) providing a keyboard having keys corresponding to an alphabet, symbols, characters and numerals;

b) selecting a set of elements from the keys consisting of E, E1, E2 . . . En;

c) permutating the elements into various sequences of random rearrangements of E, E1, E2 . . . En according to a cognitive relationship of the elements with respect to each other selected from the group consisting of their position on the keyboard, spatial relationship on the keyboard, verbal form, written form, spoken form, and motor movement relationship; and d) having the student practice permutations of each of the sequences of random rearrangements of the elements.

7. A method for instructing a student regarding the cognitive relationships between a primary element (E) and its related elements (E1, E2, E3 . . . En-2, En-1, En) in a set, comprising the steps of:

a) arranging the elements in an original sequence of the elements consisting of E, E1, E2, E3 . . . En-2, En-1, En;

b) deriving a first permutation of the original sequence consisting of the first element E, followed by the last element En, followed by the first element plus one E1, followed by the last element minus one En-1, followed by the first element plus two E2, followed by the last element minus two En-2, followed by the first element plus three E3;

c) deriving a second permutation of the original sequence consisting of the second element E1, followed by the last element En, followed by the second element plus one E2, followed by the last element minus one En-1, followed by the second element plus two E3, followed by the last element minus two En-2, and since there are no remaining elements between E3 and En-2, back to the first element E;

d) deriving a third permutation of the original sequence consisting of the third element E2, followed by the last element En, followed by the third element plus one E3, followed by the last element minus one En-1, followed by the third element plus two En-2, and since there are no remaining elements between E3 and En-2, back to the first element E, followed by the third element minus one E1;

e) deriving a fourth permutation of the original sequence consisting of the fourth element E3, followed by the last element En, followed by the fourth element plus one En-2, followed by the last element minus one En-1, followed by the first element E, followed by the fourth element minus one E2, followed by the first element plus one E1;

f) deriving a fifth permutation of the original sequence consisting of the fifth element En-2, followed by the last element En, followed by the fifth element plus one En-1, followed by the first element E, followed by the fifth element minus one E3, followed by the first element plus one E1, followed by the fifth element minus two E2;

g) deriving a sixth permutation of the original sequence consisting of the sixth element En-1, followed by the last element En, followed by the first element E, followed by the sixth element minus one En-2, followed by the first element plus one E1, followed by the sixth element minus two E3, followed by the first element plus two E2;

h) deriving a seventh permutation of the original sequence consisting of the seventh element En, followed by the first element E, followed by the seventh element minus one En-1, followed by the first element plus one E1, followed by the seventh element minus two En-2, followed by the first element plus two E2, followed by the seventh element minus three E3; and i) selecting the set of elements as notes created by playing a musical instrument.

8. The method of claim 7 including creating the notes by playing any of the keys on a piano.

9. The method of claim 8 including selecting the set of elements as piano keys typically played by one hand as the logical connection between the primary element and its related elements.

10. The method of claim 7 including creating the notes by playing all of the keys on a piano.

11. A method for instructing a student regarding the cognitive relationships between any of the notes capable of being created by a musical instrument, comprising the steps of:

a) providing a musical instrument having keys corresponding to notes created by playing the instruments;

b) selecting a set of elements from any of the keys, the set of elements consisting of E, E1, E2 . . . En;

c) permutating the elements into various sequences of random arrangements of E, E1, E2 . . . En according to a cognitive relationship of the elements with respect to each other selected from the group consisting of their position on the instrument, spatial relationship on the instrument, audible relationship, written relationships, sung, played and motor movement relationships; and d) having the student practice permutations of each of the sequences of random rearrangements of the elements.

12. The method of claim 11 including creating the notes by playing any of the keys on a piano.

13. The method of claim 11 including selecting the set of elements as piano keys typically played by one hand as the logical connection between the primary element and its related elements.

14. The method of claim 11 including creating the notes by playing all of the keys on a piano.

* * * * *